US012658541B2

(12) United States Patent
Kim et al.

(10) Patent No.: US 12,658,541 B2
(45) Date of Patent: Jun. 16, 2026

(54) ELECTRODE LEAD FOR ELECTROCHEMICAL DEVICE AND ELECTROCHEMICAL DEVICE INCLUDING THE SAME

(71) Applicant: LG Energy Solution, Ltd., Seoul (KR)

(72) Inventors: Mi-Na Kim, Daejeon (KR); Yong-Su Choi, Daejeon (KR); Gyung-Soo Kang, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 515 days.

(21) Appl. No.: 18/274,542

(22) PCT Filed: Sep. 26, 2022

(86) PCT No.: PCT/KR2022/014349
§ 371 (c)(1),
(2) Date: Jul. 27, 2023

(87) PCT Pub. No.: WO2023/075168
PCT Pub. Date: May 4, 2023

(65) Prior Publication Data
US 2024/0088531 A1     Mar. 14, 2024

(30) Foreign Application Priority Data
Oct. 28, 2021     (KR) ........................ 10-2021-0146111

(51) Int. Cl.
*H01M 50/562*          (2021.01)
*H01M 4/62*            (2006.01)
(Continued)

(52) U.S. Cl.
CPC ......... *H01M 50/562* (2021.01); *H01M 4/622* (2013.01); *H01M 50/105* (2021.01);
(Continued)

(58) Field of Classification Search
None
See application file for complete search history.

(56) References Cited

U.S. PATENT DOCUMENTS

| | | | | |
|---|---|---|---|---|
| 10,511,059 B1 * | 12/2019 | Weisenstein | ........ | H01M 50/562 |
| 11,258,143 B2 * | 2/2022 | Zheng | ................ | H01M 50/188 |

(Continued)

FOREIGN PATENT DOCUMENTS

| | | |
|---|---|---|
| EP | 4043614 A1 | 8/2022 |
| JP | 2003086170 A | 3/2003 |

(Continued)

OTHER PUBLICATIONS

Extended European Search Report including Written Opinion for Application No. 22887372.5 dated May 28, 2025. 6 pages.

(Continued)

*Primary Examiner* — Scott J. Chmielecki
(74) *Attorney, Agent, or Firm* — Lerner David LLP

(57)          ABSTRACT

The present disclosure relates to an electrode lead for an electrochemical device, including a nickel plating layer disposed on the surface of a metallic terminal, having a surface irregularity structure on the nickel plating layer, and including a polar group-containing coating layer. The present disclosure also relates to an electrochemical device including the electrode lead. The electrode lead for an electrochemical device provides increased binding force between the electrode lead and the lead film by increasing the contact area between the electrode lead and the lead film, while not causing damages upon the surface of the electrode lead.

13 Claims, 5 Drawing Sheets

(51) Int. Cl.

| | | |
|---|---|---|
| *H01M 50/105* | (2021.01) | |
| *H01M 50/178* | (2021.01) | |
| *H01M 50/186* | (2021.01) | |
| *H01M 50/193* | (2021.01) | |
| *H01M 50/571* | (2021.01) | |
| *H01M 50/586* | (2021.01) | |

(52) U.S. Cl.

CPC ....... *H01M 50/178* (2021.01); *H01M 50/186* (2021.01); *H01M 50/193* (2021.01); *H01M 50/571* (2021.01); *H01M 50/586* (2021.01)

(56) References Cited

U.S. PATENT DOCUMENTS

| | | | |
|---|---|---|---|
| 2006/0216594 A1* | 9/2006 | You | H01M 50/119 |
| | | | 429/162 |
| 2017/0170436 A1* | 6/2017 | Ibaragi | H01M 50/128 |
| 2017/0320247 A1* | 11/2017 | Aizawa | B29C 45/14 |
| 2018/0219192 A1* | 8/2018 | Ijuin | H01M 50/119 |
| 2022/0393316 A1* | 12/2022 | Kang | C25D 5/022 |
| 2022/0416289 A1* | 12/2022 | Kang | H01M 10/0404 |
| 2026/0045655 A1* | 2/2026 | Yamaguchi | H01G 11/74 |

FOREIGN PATENT DOCUMENTS

| | | | | | |
|---|---|---|---|---|---|
| JP | 2004362935 A | 12/2004 | | | |
| JP | 2005222788 A | 8/2005 | | | |
| JP | 2009-087751 A | 4/2009 | | | |
| JP | 2009-099527 A | 5/2009 | | | |
| JP | 2013196930 A | 9/2013 | | | |
| JP | 2014179193 A | 9/2014 | | | |
| JP | 2016-213228 A | 12/2016 | | | |
| JP | 2017091767 A | 5/2017 | | | |
| JP | 2017191681 A | 10/2017 | | | |
| JP | 2018-186104 A | 11/2018 | | | |
| KR | 20060085179 A | 7/2006 | | | |
| KR | 20160060375 A | 5/2016 | | | |
| KR | 20160144325 A | * | 12/2016 | ......... | H01M 10/052 |
| KR | 101698564 B1 | 1/2017 | | | |
| KR | 2019-0020563 A | 3/2019 | | | |
| KR | 20190113686 A | 10/2019 | | | |
| KR | 20190135346 A | 12/2019 | | | |
| KR | 20200003559 A | 1/2020 | | | |
| KR | 2021-0053399 A | 5/2021 | | | |
| KR | 20210062139 A | 5/2021 | | | |
| WO | 2006035695 A1 | 4/2006 | | | |
| WO | 2016-013575 A1 | 1/2016 | | | |
| WO | 2016-117711 A1 | 7/2016 | | | |

OTHER PUBLICATIONS

International Search Report for PCT/KR2022/014349 mailed Dec. 19, 2022. 3 pages.

\* cited by examiner

Ni Lα1,2

Cu Lα1,2

ELECTRODE LEAD FOR ELECTROCHEMICAL DEVICE AND ELECTROCHEMICAL DEVICE INCLUDING THE SAME

CROSS-REFERENCE TO RELATED APPLICATIONS

The present application is a national phase entry under 35 U.S.C. § 371 of International Application No. PCT/KR2022/014349, filed on Sep. 26, 2022, which claims priority from Korean Patent Application No. 10-2021-0146111, filed on Oct. 28, 2021, the disclosures of which are incorporated herein by reference.

TECHNICAL FIELD

The present disclosure relates to an electrode lead for an electrochemical device and an electrochemical device including the same.

BACKGROUND ART

Mobile information technology (IT) instruments, such as cellular phones, notebook computers and personal computers (PCs), are closely related with modern life. In addition, as the IT industrial market has been grown, electrochemical devices have been increasingly in demand as key parts. Among such electrochemical devices, secondary batteries can be used repeatedly through charge/discharge and are eco-friendly batteries using no harmful materials, such as lead, nickel and cadmium. Moreover, such secondary batteries are advantageous in that they are light and can store a large amount of energy in a small volume to show high energy density, and thus become the core of the newly grown power industry in the future. Particularly, lithium secondary batteries have been used most widely as power sources for mobile IT closely related with human life, and the application of lithium secondary batteries has been extended continuously to power sources of electric vehicles and power storage systems of new and regenerated energy.

In general, an electrochemical device includes a positive electrode, a negative electrode, a separator insulating the two electrodes from each other, an electrolyte conducting lithium ions through the separator, a battery casing in which the above constitutional elements are received, and an electrode lead configured to form a path of electric current to the outside of the battery casing. In addition, the electrochemical device may further include a lead film, which is bound to the electrode lead to prevent generation of a short-circuit between the electrode lead and the battery casing, while functioning to seal the electrode lead and the battery casing.

However, the interface between the electrode lead and the battery casing shows poor sealing strength, and thus frequently causes the problems of electrolyte leakage and gas introduction/discharge at the interface. For this, active studies have been conducted in order to solve the above-mentioned problems.

The sealing strength between the electrode lead and the battery casing is affected by the sealing strength between the electrode lead and the lead film, and the sealing strength between the lead film and the battery casing.

In order to improve the sealing strength between the lead film and the battery casing, active attempts have been made to increase the thickness of the lead film and to use a material having physical properties similar to the physical properties of the fused portion of the battery casing as a lead film. However, improvement of the sealing strength between the electrode lead and the lead film faces technical limitations.

Therefore, there is an imminent need for developing technologies for improving the sealing strength between the electrode lead and the lead film.

DISCLOSURE

Technical Problem

The present disclosure is designed to solve the problems of the related art, and therefore the present disclosure is directed to providing an electrode lead for an electrochemical device capable of providing improved adhesion between the electrode lead and a lead film, and an electrochemical device including the same.

Technical Solution

In one aspect of the present disclosure, there is provided an electrode lead for an electrochemical device according to any one of the following embodiments.

According to the first embodiment of the present disclosure, there is provided an electrode lead for an electrochemical device, including:

a metallic terminal;

a nickel plating layer disposed on the surface of the metallic terminal; and a coating layer disposed on the nickel plating layer and containing a polar group, wherein the coating layer has a surface irregularity structure.

According to the second embodiment of the present disclosure, there is provided the electrode lead for an electrochemical device as defined in the first embodiment, wherein the polar group may be an —OH or —O group.

According to the third embodiment of the present disclosure, there is provided the electrode lead for an electrochemical device as defined in the first or the second embodiment, wherein the coating layer containing a polar group may include an anhydrous oxide.

According to the fourth embodiment of the present disclosure, there is provided the electrode lead for an electrochemical device as defined in the third embodiment, wherein the anhydrous oxide may include a chromium-based anhydrous oxide, a zirconium-based anhydrous oxide, a titanium-based anhydrous oxide, a manganese-based anhydrous oxide, a molybdenum-based anhydrous oxide, a cerium-based anhydrous oxide, or two or more of them.

According to the fifth embodiment of the present disclosure, there is provided the electrode lead for an electrochemical device as defined in any one of the first to the fourth embodiments, wherein the coating layer containing a polar group may further include a binder polymer.

According to the sixth embodiment of the present disclosure, there is provided the electrode lead for an electrochemical device as defined in the fifth embodiment, wherein the binder polymer may include polyvinyl alcohol, acrylic polymer, epoxy-based polymer, olefinic polymer, phenolic resin, or two or more of them.

According to the seventh embodiment of the present disclosure, there is provided the electrode lead for an electrochemical device as defined in any one of the first to the sixth embodiments, wherein the surface irregularity structure may be formed by rolling, sand blasting, grinding using SiC paper, mechanical surface treatment using laser irradiation or ultrasonic wave application, chemical surface treatment using partial erosion caused by a chemical substance, or a combination thereof.

In another aspect of the present disclosure, there is provided an electrochemical device according to any one of the following embodiments.

According to the eighth embodiment of the present disclosure, there is provided an electrochemical device, including:

an electrode assembly having an electrode lead attached thereto;

a battery casing configured to receive the electrode assembly; and a lead film partially surrounding the outer surface of the electrode lead and interposed between the electrode lead and the battery casing, wherein the electrode lead includes the electrode lead for an electrochemical device as defined in any one of the first to the seventh embodiments.

According to the ninth embodiment of the present disclosure, there is provided the electrochemical device as defined in the eighth embodiment, wherein the lead film may include a nonpolar polymer resin, a polar polymer resin or a combination thereof.

According to the tenth embodiment of the present disclosure, there is provided the electrochemical device as defined in the ninth embodiment, wherein the nonpolar polymer resin may include oriented polypropylene (OPP), polyethylene terephthalate (PET), polyethylene naphthalate (PEN), polybutylene terephthalate (PBT), polybutylene naphthalate (PBN), polyimide (PI), or two or more of them.

According to the eleventh embodiment of the present disclosure, there is provided the electrochemical device as defined in the ninth embodiment, wherein the polar polymer resin may include an acid-modified polypropylene (PPa).

According to the twelfth embodiment of the present disclosure, there is provided the electrochemical device as defined in the ninth or the eleventh embodiment, wherein the polar polymer resin may have a polar group selected from maleate, maleic anhydride, fumarate, maleimide, anhydrous maleimide, itaconate, itaconic anhydride and derivatives thereof, or two or more of the polar groups, introduced thereto.

According to the thirteenth embodiment of the present disclosure, there is provided the electrochemical device as defined in any one of the eighth to the twelfth embodiment, wherein the electrode lead may be a negative electrode lead, which may include a metallic terminal plated with nickel of the nickel plating layer.

Advantageous Effects

The electrochemical device according to an embodiment of the present disclosure includes a surface irregularity structure and a polar group-containing coating layer on the surface of the metallic terminal, and thus shows improved adhesion between the electrode lead and the lead film.

Even though the electrochemical device according to an embodiment of the present disclosure includes a surface irregularity structure formed on the surface of the metallic terminal, the electrode lead surface is not damaged, thereby providing improved adhesion between the electrode lead and the lead film, while not adversely affecting the corrosion resistance.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

An electrode lead for an electrochemical device according to one aspect of the present disclosure has a surface irregularity structure on the surface of a metallic terminal, and includes a polar group-containing coating layer on the surface of the metallic terminal having a surface irregularity structure.

Figure 1:
FIG. 1 illustrates the electrode lead for an electrochemical device according to an embodiment of the present disclosure.

FIG. 1 illustrates the electrode lead for an electrochemical device according to an embodiment of the present disclosure.

Referring to FIG. 1, the electrode lead 10 for an electrochemical device according to an embodiment of the present disclosure has a surface irregularity structure on the surface of a metallic terminal. Particularly, the surface irregularity structure is formed on the surface of the electrode lead that is in contact with a lead film.

The electrode lead 10 for an electrochemical device according to an embodiment of the present disclosure is provided with a surface irregularity structure on the surface of a metallic terminal, and thus can provide a large surface area to the electrode lead and can improve the adhesion between the electrode lead and the lead film through the anchoring effect. In addition, when water infiltrates to the binding portion of the lead film with the electrode lead or an electrolyte is leaked, the electrode lead can inhibit migration of water or the electrolyte to the highest degree by extending their migration paths significantly.

The surface irregularity structure may be formed totally or partially on the contact surface between the electrode lead and the lead film.

The surface irregularity structure may be formed through various processes. For example, the surface irregularity structure may be formed by rolling, sand blasting, grinding using SiC paper, mechanical surface treatment using laser irradiation or ultrasonic wave application, or chemical surface treatment using partial erosion caused by a chemical substance. In a variant, the surface irregularity structure may be formed through a combination of mechanical surface treatment with chemical surface treatment.

The rolling process may include a temper rolling process. The temper rolling process refers to subjecting the electrode lead to light cold rolling of about 0.3-3.0% in order to improve the mechanical properties of the electrode lead after finishing annealing and to control the surface condition.

For example, the partial erosion caused by a chemical substance may be carried out by applying phosphoric acid, hydrochloric acid or nitric acid to the electrode lead, and washing the electrode lead after the lapse of such a period of time that desired fine surface irregularities may be formed. In this manner, it is possible to form a surface irregularity structure on the surface of the electrode lead.

Although there is no particular limitation in the formation of the surface irregularity structure and orientation thereof, the surface irregularity structure may be formed in such a manner that a plurality of grooves, inclined at an angle of 0 (horizontal) to 49° to the surface of the electrode lead that is not in contact with the lead film, may be formed. Such grooves may increase the contact surface with the lead film with ease and may extend the migration length of the electrolyte and water with ease.

In the surface irregularity structure, the size (i.e. depth of valleys) of surface irregularities may be 1-50% based on the thickness of the electrode lead. When the size of the surface irregularities satisfies the above-defined range, it is possible to further improve the adhesion between the electrode lead and the lead film and to facilitate extension of the migration path of water, etc. In addition, it is possible to easily prevent degradation of the mechanical properties of the electrode lead 10.

Referring to FIG. 1, the electrode lead 10 for an electrochemical device according to an embodiment of the present disclosure includes a coating layer 11 containing a polar group on the surface of the metallic terminal having a surface irregularity structure. The polar group allows the lead film and the electrode lead to form a Van der Waals bond through electrostatic attraction force, thereby improving the adhesion between the electrode lead and the lead film. In addition, it is possible to improve the corrosion resistance of the electrode lead surface.

According to an embodiment of the present disclosure, the polar group may be an —OH or —O group.

According to an embodiment of the present disclosure, the coating layer 11 containing a polar group may include an anhydrous oxide. The anhydrous oxide includes an —OH or —O group to allow the lead film and the electrode lead 10 to form a Van der Waals bond, thereby facilitating improvement of the adhesion between the electrode lead 10 and the lead film.

According to an embodiment of the present disclosure, the anhydrous oxide may be a chromium-based anhydrous oxide or a chromium-free anhydrous oxide.

For example, the chromium-free anhydrous oxide may include a zirconium-based anhydrous oxide, a titanium-based anhydrous oxide, a manganese-based anhydrous oxide, a molybdenum-based anhydrous oxide, a cerium-based anhydrous oxide, or two or more of them.

When the anhydrous oxide is a chromium-based anhydrous oxide, the coating layer containing a polar group may be formed on the surface of the electrode lead 10 through the treatment with chromate. The treatment with chromate may be carried out by dipping the electrode lead in a chromic acid-containing treatment solution (generally, a mixed solution of chromic acid with sulfuric acid) to form a chromate coating film on the surface of the electrode lead. In this manner, it is possible to improve the corrosion resistance and to realize surface gloss.

The treatment solution for the treatment with chromate may include 1-4 wt % of potassium ferricyanide, 3-8 wt % of trivalent or hexavalent chromium, 8-15 wt % of borofluoric acid, 5-10 wt % of zirconium fluoride and 63-83 wt % of aqueous sulfuric acid solution, based on the total weight of the treatment solution.

The treatment with chromate may be carried out with a dipping time of 30-50 seconds at a processing temperature of 15-50° C.

When the anhydrous oxide is a chromium (Cr)-free anhydrous oxide, a metal salt or a metal precursor may be used to form a metal oxide film.

For example, a zirconium oxide film may be formed from hexafluorozirconate ($H_2ZrF_6$). When forming a titanium oxide film, hexafluorotitanate ($H_2TiF_6$) is used frequently.

According to an embodiment of the present disclosure, the coating layer 11 containing a polar group may further include a binder polymer. When the coating layer 11 containing a polar group further includes a binder polymer, the adhesion between the electrode lead and the lead film may be further enhanced.

According to an embodiment of the present disclosure, the binder may include polyvinyl alcohol, acrylic polymer, epoxy-based polymer, olefinic polymer, phenolic resin, or two or more of them.

Since the electrode lead for an electrochemical device according to an embodiment of the present disclosure is provided with a coating layer including a surface irregularity structure and containing a polar group on the surface of the electrode lead, it is possible to provide the effect of mechanical binding and chemical binding between the electrode lead and the lead film at the same time.

In another aspect, there is provided an electrochemical device, including: an electrode assembly having an electrode lead attached thereto; a battery casing configured to receive the electrode assembly; and a lead film partially surrounding the outer surface of the electrode lead and interposed between the electrode lead and the battery casing, wherein the electrode lead is the above-described electrode lead.

Figure 2:
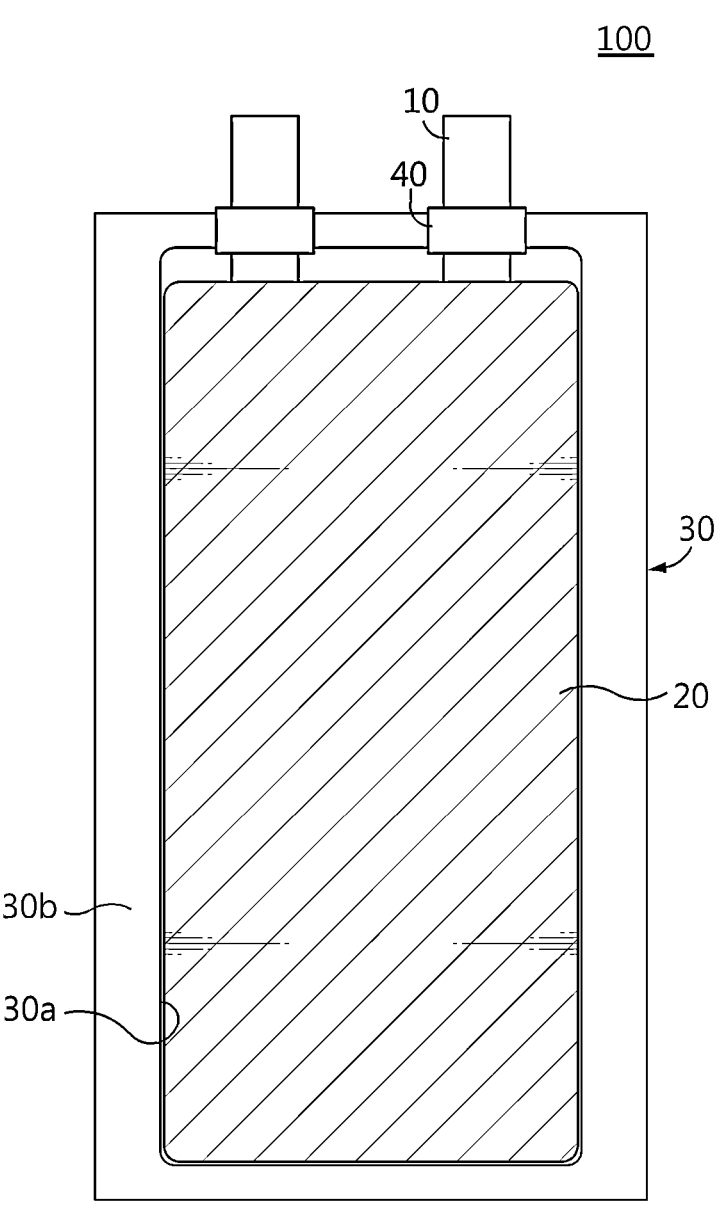
FIG. 2 illustrates the electrochemical device according to an embodiment of the present disclosure.

FIG. 2 is an enlarged view illustrating the electrochemical device according to an embodiment of the present disclosure.

Referring to FIG. 2, the electrochemical device 100 according to an embodiment of the present disclosure includes an electrode assembly 20 having an electrode lead 10 attached thereto, and a battery casing 30.

The electrode assembly 20 includes a positive electrode plate, a negative electrode plate and a separator. In the electrode assembly 20, the positive electrode plate and the negative electrode plate may be stacked successively with the separator interposed therebetween.

The positive electrode plate may include a positive electrode current collector made of metal foil, such as aluminum (Al) foil, having high conductivity, and a positive electrode active material layer coated on at least one surface of the positive electrode current collector. In addition, the positive electrode plate may include a positive electrode tab made of a metallic material, such as aluminum (Al), at one end thereof. The positive electrode tab may be extended and protrude out from one end of the positive electrode plate, or may be welded to one end of the positive electrode plate or bonded thereto by using a conductive adhesive.

The negative electrode plate may include a negative electrode current collector made of conductive metal foil, such as copper (Cu) foil, and a negative electrode active material layer coated on at least one surface of the negative electrode current collector. In addition, the negative electrode plate may include a negative electrode tab made of a metallic material, such as copper (Cu) or nickel (Ni), at one end thereof. The negative electrode tab may be extended and protrude out from one end of the negative electrode plate, or may be welded to one end of the negative electrode plate or bonded thereto by using a conductive adhesive.

The separator is interposed between the positive electrode plate and the negative electrode plate and insulates both electrode plates from each other, and may be formed in a porous membrane shape so that lithium ions may pass between the positive electrode plate and the negative electrode plate. For example, the separator may include a porous membrane using polyethylene (PE), polypropylene (PP), or a composite film thereof.

In addition, an inorganic coating layer may be provided on the surface of the separator. The inorganic coating layer may have a structure in which inorganic particles are bound to one another by the binder to form interstitial volumes among the particles.

The electrode assembly 20 may include a jelly-roll type (wound) electrode assembly having a structure including elongated sheet-like positive electrodes and negative electrodes wound with a separator interposed between a positive electrode and a negative electrode, a stack type (stacked) electrode assembly including a plurality of positive electrodes and negative electrodes cut into a unit with a predetermined size and stacked successively with a separator interposed between a positive electrode and a negative electrode, a stacked/folded electrode assembly having a structure in which bi-cells or full cells including a predetermined unit of positive electrodes and negative electrodes stacked with a separator interposed between a positive electrode and a negative electrode, or the like.

The battery casing 30 functions to receive the electrode assembly 20.

According to an embodiment of the present disclosure, the battery casing 30 may include a receiving portion 30a configured to receive the electrode assembly 20 and a sealing portion 30b formed to seal the electrode assembly 20.

The sealing portion 30b may include a sealant resin, which may be fused along the outer circumferential surface of the receiving portion 30a to seal the electrode assembly 20.

The fusion may be carried out by hot fusion, ultrasonic fusion, or the like. However, the fusion process is not particularly limited, as long as it can fuse the sealing portion 30b.

According to an embodiment of the present disclosure, the battery casing 30 may be provided in the form of a multilayer structured film including an outer layer configured to protect a battery from external impact, a metal barrier layer configured to interrupt moisture, and a sealant layer for sealing the battery casing 30.

The outer layer may include polyethylene terephthalate (PET), polybutylene terephthalate, polyethylene naphthalate, polybutylene naphthalate, copolymerized polyester, polycarbonate, nylon, or other polyester-based films, and may have a monolayer or multilayer structure.

The metal barrier layer may include aluminum, copper, or the like.

The sealant layer may include a sealant resin, and may have a monolayer or multilayer structure.

According to an embodiment of the present disclosure, the sealant resin may include polypropylene (PP), acid modified polypropylene (PPa), random polypropylene, ethylene propylene copolymer, or two or more of them. The ethylene propylene copolymer may include ethylene propylene rubber, ethylene propylene block copolymer or the like, but is not limited thereto.

According to an embodiment of the present disclosure, the battery casing 30 may have a pouch-like shape.

According to an embodiment of the present disclosure, when the battery casing 30 has a pouch-like shape, it may include an upper pouch and a lower pouch. When the battery casing 30 includes an upper pouch and a lower pooch, the outer circumferential surface of the upper pouch and that of the lower pouch may be fused to each other to seal the battery.

When the battery casing 30 has a pouch-like shape, the sealing portion 30b may be formed by four-side sealing or three-side sealing at the edges of the battery casing. The three-side sealing structure refers to a structure obtained by forming an upper pouch and a lower pouch in a single pouch sheet, folding the boundary surface of the upper pouch and the lower pouch so that the electrode assembly receiving portions 30a formed in the upper pouch and the lower pouch may be folded, and sealing the edges of the remaining three sides, except the folded portion.

Referring to FIG. 2, the electrode lead 10 may be received in the battery casing 30 in such a manner that it may be partially exposed to the outside of the battery casing 30.

Referring to FIG. 2, the electrochemical device 100 according to an embodiment of the present disclosure is provided with a lead film.

The lead film 40 partially surrounds the outer surface of the electrode lead 10, and is interposed between the electrode lead 10 and the battery casing 30. The lead film is interposed between the electrode lead 10 and the battery casing 30 to assist the binding of the electrode lead 10 with the battery casing 30. The battery is sealed at the surface where the lead film 40 is in contact with the battery casing 30.

The lead film 40 may be disposed on at least one surface of the electrode lead 10. In a variant, the lead film 40 is disposed on the top surface and bottom surface of the electrode lead in such a manner that the lead films may face each other, and the electrode lead 10 and the lead film 40, or the lead film 40 and the battery casing 30 may be bound to each other through simple hot fusion.

The lead film 40 may include a nonpolar polymer resin, a polar polymer resin, or a combination thereof.

According to an embodiment of the present disclosure, the nonpolar polymer resin may include oriented polypropylene (OPP), polyethylene terephthalate (PET), polyethylene naphthalate (PEN), polybutylene terephthalate (PBT), polybutylene naphthalate (PBN), polyimide (PI), or two or more of them.

Figure 3:
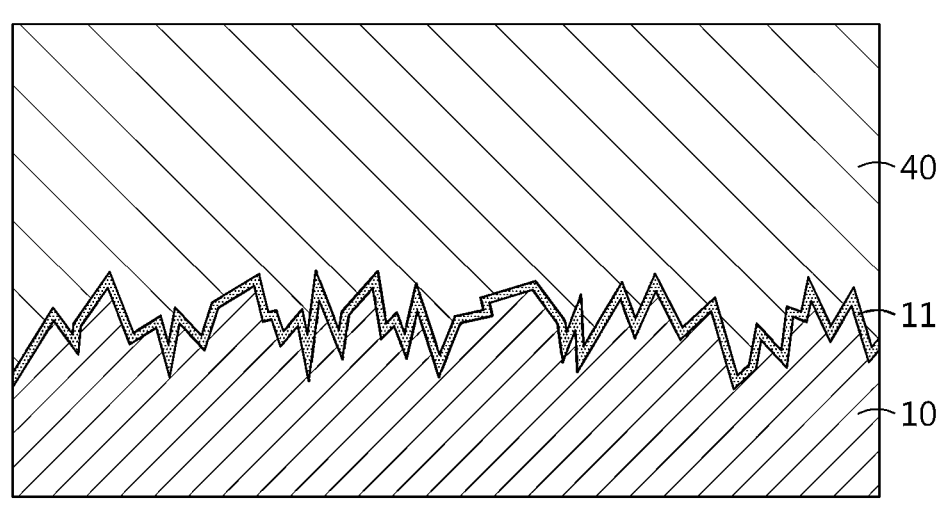
FIG. 3 is an enlarged view illustrating the interface between the electrode lead and the lead film in the electrochemical device according to an embodiment of the present disclosure.
Figure 4:
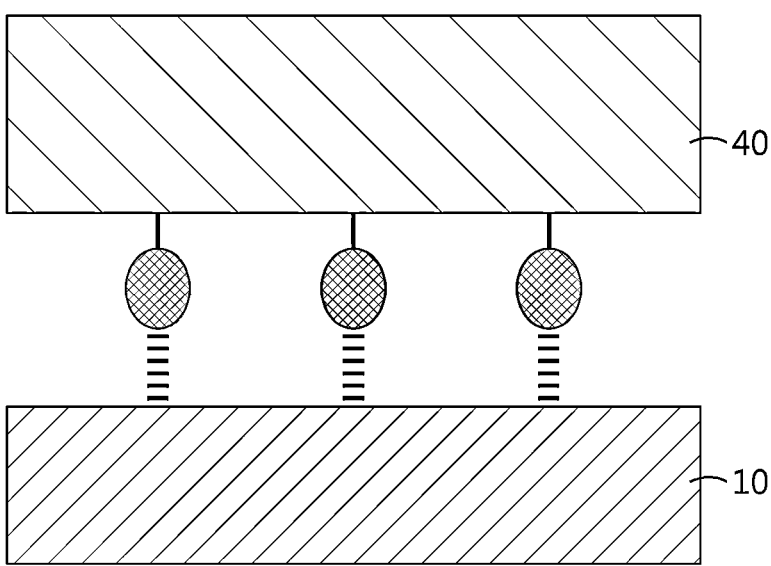
FIG. 4 is an enlarged view illustrating the interface between the electrode lead and the lead film in the electrochemical device according to an embodiment of the present disclosure.

FIGS. 3 and 4 are enlarged views illustrating the interface between the electrode lead and the lead film in the electrochemical device according to an embodiment of the present disclosure.

Referring to FIGS. 3 and 4, when the lead film 40 includes a polar polymer resin, Van der Waals binding force between the polar group of the lead film and the polar group of the electrode lead 10 may be increased. In this manner, the adhesion between the electrode lead 10 and the lead film 40 may be further improved.

According to an embodiment of the present disclosure, the polar polymer resin may include an acid-modified polypropylene (PPa). When the polar polymer resin includes an acid-modified polypropylene, the polar group of the acid-modified polypropylene and the polar group of the electrode lead 10 are bound to each other through Van der Waal bonding. In this manner, the adhesion between the electrode lead 10 and the lead film 40 may be further enhanced.

The polypropylene resin may include propylene polymer (homo-polypropylene), propylene (PP) copolymer, propylene terpolymer, or the like. In addition, the propylene copolymer may include propylene-ethylene block copolymer, or the like, and the propylene terpolymer may include propylene-ethylene-butylene block copolymer, or the like.

According to an embodiment of the present disclosure, the polar polymer resin may have a polar group selected from maleate, maleic anhydride, fumarate, maleimide, anhydrous maleimide, itaconate, itaconic anhydride and derivatives thereof, or two or more of the polar groups, introduced thereto.

According to an embodiment of the present disclosure, the electrode lead 10 may be a positive electrode lead or a negative electrode lead.

When the electrode lead 10 is a positive electrode lead, the metallic terminal forming the electrode lead 10 may include aluminum beneficial to conductivity.

When the electrode lead 10 is a negative electrode lead, the metallic terminal forming the electrode lead 10 may be a metallic terminal plated with nickel. When the metallic terminal forming the electrode 10 is plated with nickel, there is an advantage in terms of conductivity, and corrosion of the electrode lead 10 may be prevented from a long-term perspective. In other words, when the electrode lead 10 includes a metallic terminal plated with nickel, and further includes a coating layer 11 containing a surface irregularity structure and a polar group on the surface of the nickel-plated metallic terminal, it is possible to improve the adhesion between the electrode lead 10 and the lead film 40, while not adversely affecting the corrosion resistance.

As described above, the metallic terminal forming the electrode lead 10 may be a nickel-plated metallic terminal. In other words, the electrode lead 10 may include the metallic terminal, nickel plating layer disposed on the surface of the metallic terminal, and a coating layer 11 disposed on the nickel plating layer and containing a polar group. Even when the metallic terminal forming the electrode lead 10 is plated with nickel, the electrode lead in the electrochemical device according to an embodiment of the present disclosure may be prevented from damages upon the nickel plating by virtue of the surface irregularity structure on the surface of the electrode lead. That is to say, since the size of the surface irregularity structure is set to a small depth up to the limit of the thickness of the coating layer 11, the nickel plating on the surface of the metallic terminal may be retained with no damages. Therefore, the surface of the nickel-plated metallic terminal is not damaged physically and chemically. In this manner, it is possible to improve the adhesion between the electrode lead 10 and the lead film 40, while not adversely affecting the corrosion resistance.

The process for plating the metallic terminal with nickel may include a Ni strike process of forming a nickel plating film weakly to improve the adhesion of the nickel plating, Ni plating process of forming a Ni plating film to a desired thickness, or the like.

Mode for Disclosure

Examples will be described more fully hereinafter so that the present disclosure can be understood with ease. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

Example 1

First, a nickel plating film was formed on the surface of copper foil having a thickness of 200 μm by using a plating solution containing 600 mL/L of nickel sulfaminate, 6 g/L of nickel chloride and 30 g/L of boric acid through an electrochemical process (electroplating process).

An electrode lead was dipped in a treatment solution containing 800-1000 ppm of chromium to form a polar group-containing chromate coating film on the surface of the copper foil having the nickel plating layer formed thereon.

The surface of the copper foil having the polar group-containing coating layer was subjected to laser patterning. The surface-treated coper foil was welded to the electrode tab of an electrode assembly, and a polypropylene film having a maleate polar group was attached to each of the top surface and bottom surface to obtain an electrode lead.

Then, the electrode assembly was mounted to a pouch-like casing made of an aluminum laminate sheet, a carbonate-based lithium electrolyte containing 1 M $LiPF_6$ was injected thereto, and the sheet was hot fused to obtain an electrochemical device.

Test Example 1: Electrode Lead Surface Analysis

Figure 5:
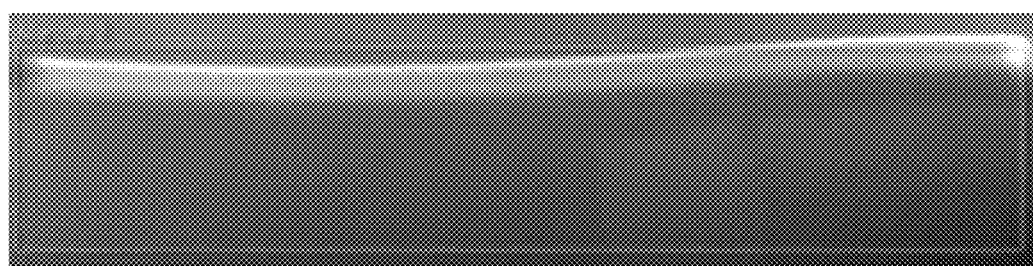
FIG. 5 is a scanning electron microscopic (SEM) image illustrating the surface portion of the electrode lead that is in contact with the lead film, in the electrode lead according to Example 1.
Figure 5:
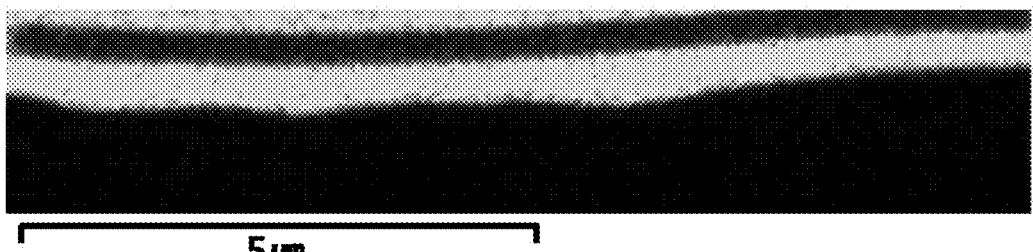
Figure 5:
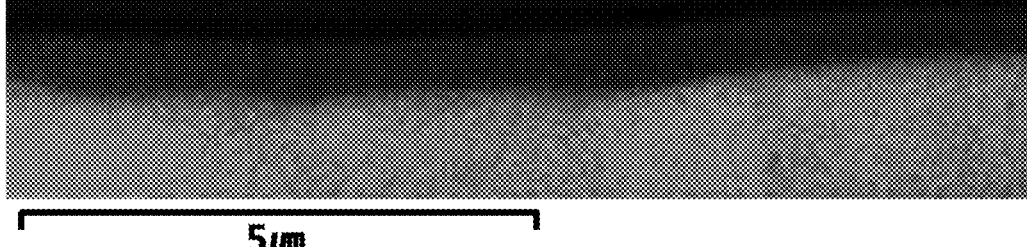

In the electrode lead according to Example 1, the portion in contact with the lead film and the portion not in contact with the lead film was observed through scanning electron microscopic (SEM) images. The results are shown in FIG. 5.

It can be seen that although the electrode lead according to Example 1 has a surface irregularity structure, the nickel plating layer on the surface of the electrode lead that is in contact with the lead film is not damaged.

Figure 6:
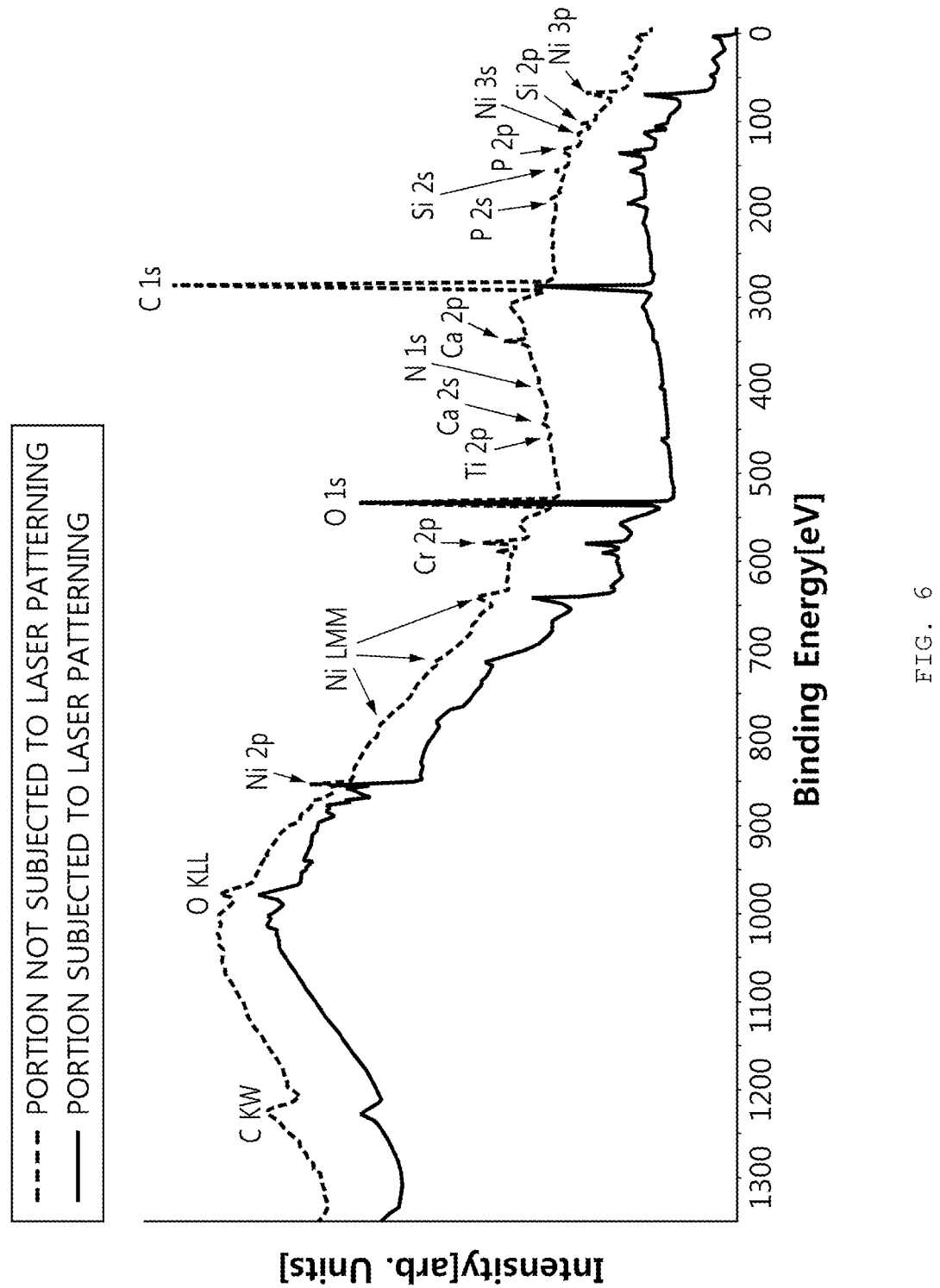
FIG. 6 shows a survey scan spectrum of the section of the portion that is in contact with the lead film and that of the portion that is not in contact with the lead film, in the electrode lead according to Example 1.

In addition, FIG. 6 shows the survey scan spectrum of the sectional surface of the portion in contact with the lead film and the portion not in contact with the lead film in the electrode lead according to Example 1. Further, the quantitative analysis results of the electrode lead surface are shown in Table 1.

The quantitative analysis of the electrode lead surface was carried out through X-ray photoelectron spectroscopy (XPS) by using K-Alpha instrument available from Thermo Fisher Scientific Inc. under the following conditions:

X-ray source: monochromatic A1 Kα (1486.6 eV)

X-ray spot size: 400 μm

Survey scan: pass energy 200 eV, energy step 1 eV, dwell time 10 ms

TABLE 1

| | Portion in contact with lead film | | Portion not in contact with lead film | |
|---|---|---|---|---|
| | Average (at. %, 3 points) | Deviation (at. %, 3 points) | Average (at. %, 3 points) | Deviation (at. %, 3 points) |
| C | 45.9 | 3.1 | 70.4 | 0.6 |
| Ca | 0.8 | 0.05 | 1.3 | 0.02 |
| Cr | 1.4 | 0.1 | 1.0 | 0.04 |
| N | 1.4 | 0.1 | 1.2 | 0.1 |
| Ni | 1.9 | 0.4 | 1.1 | 0.1 |
| O | 37.6 | 1.8 | 20.0 | 0.7 |
| P | 7.6 | 0.7 | 2.4 | 0.1 |
| Si | 3.1 | 0.2 | 2.3 | 0.1 |
| Ti | 0.3 | 0.04 | 0.3 | 0.01 |

As can be seen from FIG. 6 and Table 1, even though the electrode lead according to Example 1 has a surface irregularity structure, the nickel plating layer on the surface of the electrode lead that is in contact with the lead film is not damaged. In other words, nickel is not removed but still remains even at the portion subjected to laser patterning, in the electrode lead according to Example 1.

DESCRIPTION OF DRAWING NUMERALS

10: Electrode lead
11: Polar group-containing coating layer
20: Electrode assembly
30: Battery casing
30*a*: Receiving portion
30*b*: Sealing portion
40: Lead film
100: Electrochemical device
What is claimed is:

1. An electrode lead for an electrochemical device, comprising:
   a metallic terminal;
   a nickel plating layer disposed on a surface of the metallic terminal; and
   a coating layer disposed on the nickel plating layer and containing a polar group, the coating layer defining a surface having a surface irregularity structure.

2. The electrode lead according to claim 1, wherein the polar group is an —OH or —O group.

3. The electrode lead according to claim 1, wherein the coating layer containing the polar group comprises an anhydrous oxide.

4. The electrode lead according to claim 3, wherein the anhydrous oxide comprises one or more of: a chromium-based anhydrous oxide, a zirconium-based anhydrous oxide, a titanium-based anhydrous oxide, a manganese-based anhydrous oxide, a molybdenum-based anhydrous oxide, or a cerium-based anhydrous oxide.

5. The electrode lead according to claim 1, wherein the coating layer containing the polar group further comprises a binder polymer.

6. The electrode lead according to claim 5, wherein the binder polymer comprises one or more of: polyvinyl alcohol, acrylic polymer, epoxy-based polymer, olefinic polymer, or phenolic resin.

7. The electrode lead according to claim 1, wherein the surface irregularity structure is formed by rolling, sand blasting, grinding using SiC paper, mechanical surface treatment using laser irradiation or ultrasonic wave application, chemical surface treatment using partial erosion caused by a chemical substance, or a combination thereof.

8. An electrochemical device comprising:
   an electrode assembly having the electrode lead according to claim 1 attached thereto;
   a battery casing receiving the electrode assembly therein; and
   a lead film partially surrounding an outer surface of the electrode lead and interposed between the electrode lead and the battery casing.

9. The electrochemical device according to claim 8, wherein the lead film comprises a nonpolar polymer resin, a polar polymer resin, or a combination thereof.

10. The electrochemical device according to claim 9, wherein the lead film comprises the nonpolar polymer resin, and the nonpolar polymer resin comprises one or more of: oriented polypropylene (OPP), polyethylene terephthalate (PET), polyethylene naphthalate (PEN), polybutylene terephthalate (PBT), polybutylene naphthalate (PBN), or polyimide (PI).

11. The electrochemical device according to claim 9, wherein the lead film comprises the polar polymer resin, and the polar polymer resin comprises an acid-modified polypropylene (PPa).

12. The electrochemical device according to claim 9, wherein the lead film comprises the polar polymer resin, and the polar polymer resin has a polar group selected from maleate, maleic anhydride, fumarate, maleimide, anhydrous maleimide, itaconate, itaconic anhydride and derivatives thereof, or two or more of the polar groups, introduced thereto.

13. The electrochemical device according to claim 8, wherein the electrode lead is a negative electrode lead comprising a metallic terminal plated with the nickel of the nickel plating layer.

* * * * *